Figure 7:
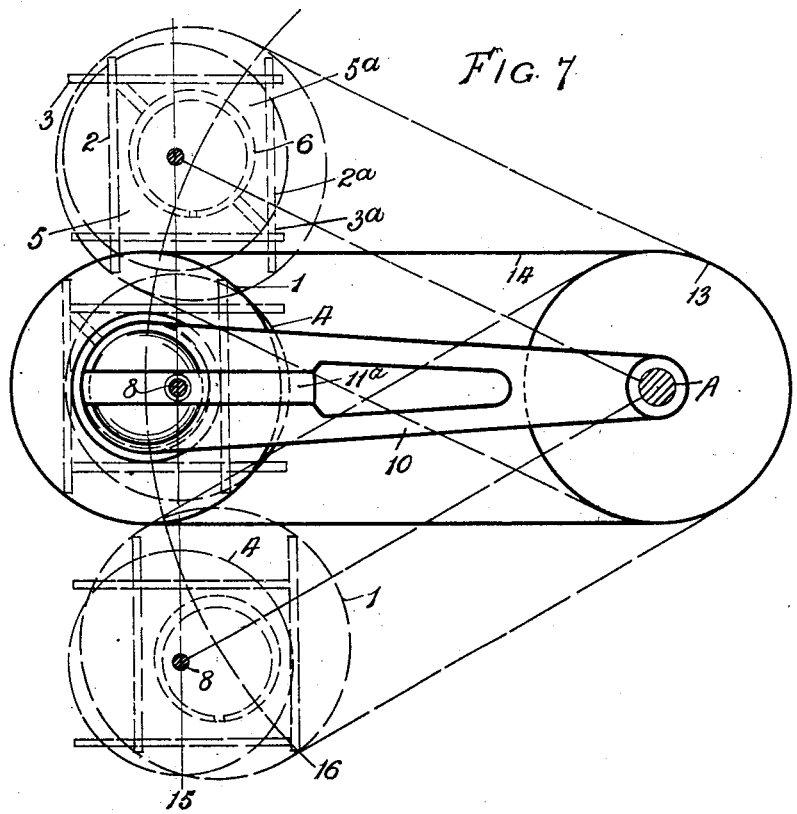

E. J. WELFFENS.
OLDHAM COUPLING.
APPLICATION FILED JUNE 20, 1919.
1,370,864.
Patented Mar. 8, 1921.
2 SHEETS—SHEET 1.
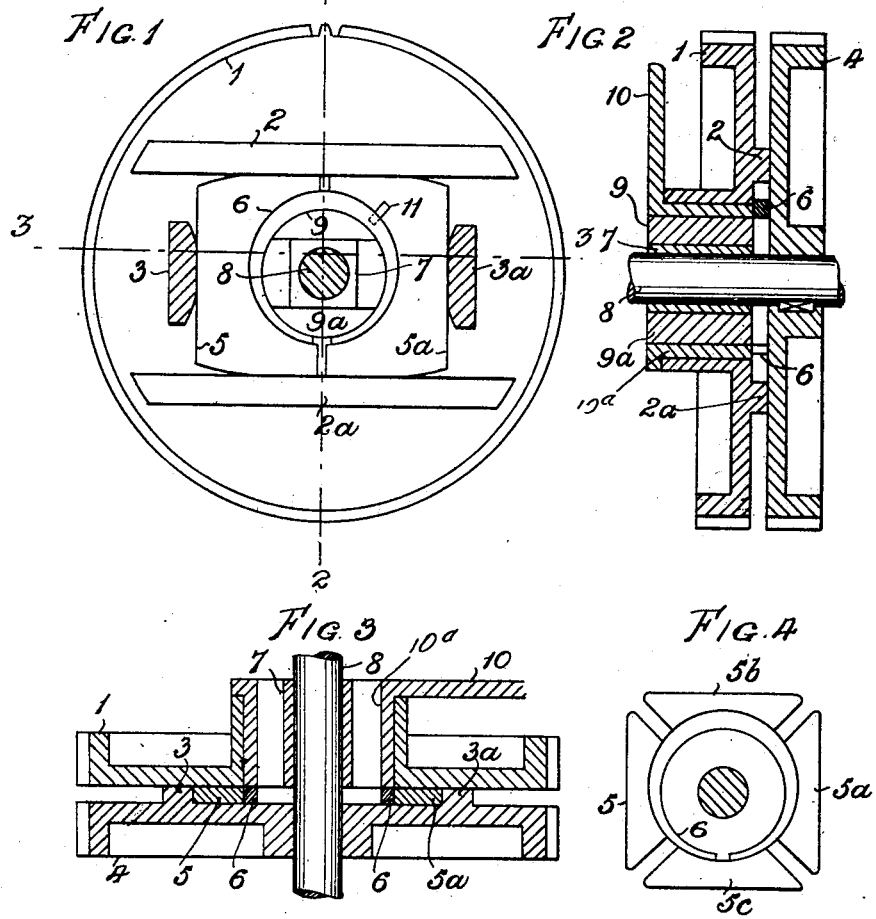
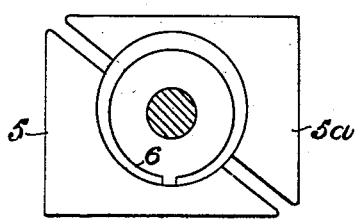
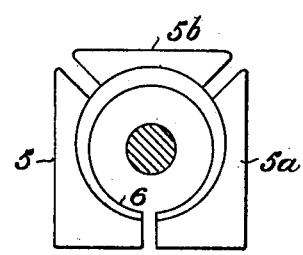
INVENTOR:
Emile John Welffens
By Wm Wallace White
ATTY.

E. J. WELFFENS.
OLDHAM COUPLING.
APPLICATION FILED JUNE 20, 1919.

1,370,864.

Patented Mar. 8, 1921
2 SHEETS—SHEET 2.

INVENTOR:
Emile John Welffens
By Wm Wallace White
ATTY.

UNITED STATES PATENT OFFICE.

EMILE JOHN WELFFENS, OF MANCHESTER, ENGLAND.

OLDHAM COUPLING.

1,370,864.        Specification of Letters Patent.        Patented Mar. 8, 1921.

Application filed June 20, 1919. Serial No. 305,615.

*To all whom it may concern:*

Be it known that I, EMILE JOHN WELFFENS, a subject of the King of the Belgians, residing at 8 Mauldeth road west, Withington, Manchester, in the county of Lancaster, England, have invented new and useful Improvements in and Connected with Oldham Couplings, of which the following is a specification.

The invention relates to shock and chatter absorbing couplings of the Oldham type.

When two members, parallel in position, connected by means of an Oldham coupling and supported on a common shaft, carry or transmit loads which may be irregular and operate at relatively high speeds with a considerable deviation of centers, either constant or variable, the operation of the combination, when comprising a rigid coupling member, is generally unsatisfactory on account of the vibration and chatter developed.

Chatter absorbing couplings have already been used and proposed, but such couplings have always had a rigid connecting member, chatter being avoided by providing springs creating lateral pressure and consequent drag. Such couplings however have not possessed shock absorbing qualities.

It is the object of this invention to provide a coupling of the Oldham type which is spring loaded, the loading being preferably effected by providing a connecting member consisting of two or more parts and comprising a spring, thereby giving the coupling the shock and chatter absorbing qualities aimed at.

According to the present invention these results may be obtained by providing in each of the members to be connected, a slide wherein a plate, square or rectangular divided in two or more parts suitably loaded, may displace itself, each slide gripping two opposing sides of the composite plate.

The drawings are diagrammatic, but they clearly illustrate the principle embodied in the invention. When the explanation is understood no difficulty will be experienced in applying the invention to any machine, contrivance or mechanism susceptible of improvement by its incorporation.

Figure 8:
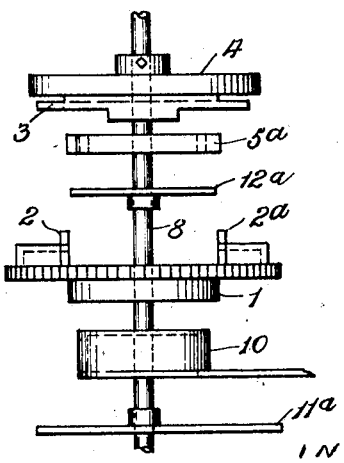

In the accompanying drawings:

Figure 1 is a side elevation of one of the members to be connected, and illustrating the connecting member in position, the shaft and the projection formed on the other connected member being shown in section;

Figs. 2 and 3 are sections taken at right angles to each other approximately on the lines 2—2 and 3—3 respectively of Fig. 1;

Figs. 4, 5 and 6 are side views illustrating various modifications of the form of composite connecting member;

Fig. 7 illustrates diagrammatically in elevation, an embodiment of the invention in a structure wherein steady continuity of motion is maintained between a stationary shaft and a shaft which moves vertically with relation to the stationary shaft, the dotted lines indicating the relative position of the connected members at different points in the travel of the shaft; and Fig. 8 illustrates in plan view the parts of the device detached from each other.

The same characters of reference designate the same parts in the different figures of the drawings.

Referring to the drawings, 1 and 4 designate the two members to be connected. Each of these members is provided on the abutting side thereof with a pair of projections adapted to form a slideway for the connecting member. As shown in Figs. 1, 2 and 3, the projections 2 and 2$^a$ are cast integral with the member 1, and the projections 3 and 3$^a$ are cast integral with the member 4, the projections 3 and 3$^a$ being of less width than the distance between the projections 2 and 2$^a$ so as to permit the projections on the member 4 to pass between the projections on the member 1.

For connecting the members 1 and 4 for rotation together, I have provided a connecting member formed of a plurality of plates having therebetween a spring member. In the present instance, this spring is shown in the form of an eccentric ring, the eccentricity of which is such that a smooth and regular spring action results in operation. In Fig. 1 the connecting member or clutch is shown as formed of two plates 5 and 5$^a$, each having a semi-circular recess whereby, when the recesses in the plates are juxtaposed, a circular opening is formed for the reception of the ring 6, and said ring may be maintained in position by means of a dowel pin 11 projecting into a recess in one of the plates and a recess in said ring, as shown in Fig. 1. In Fig. 4 the connecting member is shown as comprising four plates 5, 5$^a$, 5$^b$ and 5$^c$, and the spring 6. This construction is especially adapted for working at high speeds and light loads and giving a very flexible connection. In Fig. 5 the connecting member is shown as consisting of two plates 5 and 5ª and the spring 6, the plates being divided diagonally instead of transversely as shown in Fig. 1. This form of construction has the advantage of giving an even fulcrum with both members and renders it unnecessary for the projections or lugs 3 and 3ª of the member 4 to be of less width than the distance between the lugs 2 and 2ª of the member 1. In Fig. 6 the connecting member is shown as comprising three plates 5, 5ª and 5ᵇ and the spring 6. This form of construction is a combination of the two forms shown in Figs. 4 and 5 and may be regarded as to flexibility as coming between the forms shown in Figs. 4 and 5. In all of the forms, a dowel pin similar to the pin 11 shown in Fig. 1, may be provided and conveniently located to maintain the ring attached to one of the plates.

The eccentric ring 6, constituting the spring, is so proportioned and the curved recesses in the plates forming the connecting member are so formed to receive spring ring 6, that the composite plate will slide without play and without undue friction in its guides and that no compression will take place with a normal load. However, as soon as shocks or irregularities come upon either of the connected members 1 and 4, momentary compression of the composite coupling plate results, thereby damping out the shock or the irregularity which caused it, while avoiding vibration and chatter.

From the foregoing, it will be seen that with any of the forms of connecting member above described, when the members 1 and 4 are brought into juxtaposition, as shown for instance in Fig. 2, the plates forming the connecting member are engaged by the projections or lugs carried by said members 1 and 4 and thereby said members are rotatable together.

Either of the members 1 and 4 may be the driver or driven member. In the present instance, the member 4 is shown keyed to a shaft 8 which rotates within a bearing 7, the exterior of which is rectangular in form, as shown clearly in Fig. 1. A pair of segments 9 and 9ª having their flat or plane sides respectively in engagement with one of the parallel sides forming the periphery of the bearing 7, are interposed between said bearing member and a sleeve carried by an arm 10, and around which sleeve the member 1 is mounted for rotation, the sleeve 10ª of the arm 10 being also rotatable on the segments 9 and 9ª. From this construction, it will be seen that the axis of the member 1 can be displaced with regard to the axis of the shaft 8 while at the same time both axes remain parallel, and this is accomplished by means of the fact that the plane side of the segments 9, 9ª, may slide on the parallel sides of the bearing member 7 so as to carry the axis of the member 1 either to the right or left of the axis of the shaft 8 looking at Fig. 1, such sliding of the segments 9, 9ª, being limited only by the bore of the sleeve 10ª, and this shifting of the relative position of the axes of the member 1 and the shaft 8 is accomplished without impairing steady continuity of motion. Any shocks or irregularities emanating from or reverberating upon either of the connected members 1 and 4 will be observed by the spring action of the composite connecting member hereinbefore described.

In the application of the improvement illustrated in Fig. 7, steady continuity of motion is maintained between a shaft A which is stationary in position and the shaft 8, which rises and falls in a vertical path with regard to the shaft A, as shown by the dotted positions. The thrust arm 10 is shown in this figure mounted at one end on the shaft A, while adjacent to its opposite end the shaft 8 is mounted in the manner illustrated in Fig. 1, and in addition a pair of members 11ª and 12ª are mounted for rotation upon shaft 8 and adapted to slide in grooves formed at the front and rear respectively of the arm 10, and serve to keep said arm in its desired relative position around the shaft 8. In this figure, 13 designates a pulley fixed to the shaft A and 14 a chain or belt passing around said pulley and around the member 1 thereby to transmit motion to said member. The perpendicular path of the member 4 is indicated by the dotted line 15 and the angular path of the member 1 by the dotted line 16. These dotted lines indicate clearly the deviation which may take place between the centers of the two members 1 and 4.

It will be observed that, as shown in Fig. 8, the slides 2, 2ª, 3 and 3ª, cast on members 1 and 4, are stepped, that only the central part of each slide or projection grips the coupling plate on nearly its full width and that the remaining length of the slides grips the plate on slightly less than half its width, thus allowing the slides to clear one another in operation. The length of the central step is determined by the travel required by the combination.

Where it is desired to connect two contiguous shafts, both the connected members might be keyed to the shafts and provided they are kept parallel, the axis of these shafts might diverge, without disturbing steady continuity of motion and without impairing the shock, chatter and irregularity absorbing qualities of the arrangement.

Other arrangements might be devised for loading Oldham couplings, for example, the lugs in which the connecting member slides might be spring loaded, but the object has been to show, by way of example some of the simplest and most effective forms such loading might take. Other arrangements would only be less simple mechanical equivalents.

What I claim and desire to secure by Letters Patent is:—

1. In a device of the class described, the combination of a shaft mounted for rotation, a member secured to said shaft for rotation therewith, a member supported by said shaft for rotation relatively thereto and adapted to be brought into abutting relation with said first member, and means for coupling said member for rotation together and comprising a pair of projections carried by each of said members on their abutting faces, a plurality of plates engaging all of said projections and a spring member located between said plates.

2. In a device of the class described, the combination of a shaft mounted for rotation, a member secured to said shaft for rotation therewith, a member supported by said shaft for rotation relatively thereto and adapted to be brought into abutting relation with said first member, and means for coupling said members for rotation together and comprising a pair of projections carried by each of said members on their abutting faces, a plurality of plates in engagement at their outer edges with all of said projections, each of said plates having at its opposite edge a curved recess, and a split spring ring engaging all of said plates at their recessed edges.

3. In a device of the class described, the combination of a shaft mounted for rotation, a member secured to said shaft for rotation therewith, a member supported by said shaft for rotation relatively thereto and adapted to be brought into abutting relation with said first member, means between said shaft and second member for permitting axial displacement of the member relatively to the shaft, and means for coupling said member for rotation together and comprising a pair of projections carried by each of said members on their abutting faces, a plurality of plates engaging all of said projections and a spring member located between said plates.

4. In a device of the class described, the combination of a shaft mounted for rotation, a member secured to said shaft for rotation therewith, a member supported by said shaft for rotation relatively thereto and adapted to be brought into abutting relation with said first member, means between said shaft and second member for permitting axial displacement of the member relatively to the shaft, and comprising a bearing for said shaft of rectangular form exteriorly, a pair of segments having their plane surfaces slidably engaging parallel sides of said bearing, and a sleeve mounted for rotation on said segments.

5. In a device of the class described, the combination of a shaft mounted for rotation, a member secured to said shaft for rotation therewith, a member supported by said shaft for rotation relatively thereto and adapted to be brought into abutting relation with said first member, means between said shaft and second member for permitting axial displacement of the member relatively to the shaft, and comprising a bearing for said shaft of rectangular form exteriorly, a pair of segments having their plane surfaces slidably engaging parallel sides of said bearing and a sleeve mounted for rotation on said segments, and means for coupling said first and second members for rotation together.

6. In a device of the class described, the combination of a shaft mounted for rotation, a member secured to said shaft for rotation therewith, a member supported by said shaft for rotation relatively thereto and adapted to be brought into abutting relation with said first member, means between said shaft and second member for permitting axial displacement of the member relatively to the shaft and comprising a bearing for said shaft of rectangular form exteriorly, a pair of segments having their plane surfaces slidably engaging parallel sides of said bearing and a sleeve mounted for rotation on said segments, and means for coupling said members for rotation together and comprising a pair of projections carried by each of said members on their abutting faces, a plurality of plates engaging all of said projections and adapted to slide between one pair thereof when said segments slide on said bearing, and a spring member located between said plates.

In testimony whereof I have signed my name to this specification.

EMILE JOHN WELFFENS.

Witnesses:
S. W. GILLETT,
HERBERT ROWLAND ABBEY.